United States Patent Office 3,390,996

Patented July 2, 1968

3,390,996

PHOTOSENSITIVE COMPOSITION COMPRISING AN ORGANIC NITROGEN-CONTAINING COLOR-GENERATOR, A PHOTO-OXIDANT AND A REDOX COUPLE

Alexander MacLachlan, Wilmington, Del., assignor to E. I. du Pont de Nemours and Company, Wilmington, Del., a corporation of Delaware No Drawing. Filed Apr. 29, 1964, Ser. No. 363,637
17 Claims. (Cl. 96—48)

ABSTRACT OF THE DISCLOSURE

A composition which forms color when irradiated with light of one wavelength and becomes relatively insensitive to that light when irradiated with light of a different wavelength. The composition comprises (a) an organic nitrogen-containing color-generator, such as a leuco dye, (b) a photooxidant, such as a hexaarylbiimidazole, which upon being irradiated oxidizes the color-generator to its colored form, (c) a redox couple of (1) a reductant, and (2) an oxidant which when activated by light reacts with the reductant forming a reducing agent which reacts with the photo-oxidant to deactivate it. The composition can be coated on a substrate such as plastic, paper or metal.

This invention is directed to light-sensitive compositions which form an intense color when irradiated with light of a wavelength $W_1$ but which, when irradiated with light of a different wavelength $W_2$, become insensitive to light of wavelength $W_1$.

More particularly, this invention deals with a composition consisting of (1) an organic color-generator, (2) a photo-oxidant, and (3) a redox couple which consists of (a) a reductant component capable of undergoing a photo-initiated redox reaction with the oxidant component and (b) an oxidant component which, when photoactivated, undergoes with the reductant component a photoinitiated redox reaction which produces a reducing agent. When irradiated with a pattern of light of wavelength $W_1$, the organic color-generator and the photo-oxidant undergo a reaction to form an image corresponding to the pattern of light. Light of a second wavelength $W_2$ causes the redox couple to produce a reducing agent which prevents further color formation by reacting with the photo-oxidant in preference to the color-generator. The composition is thus deactivated by light of wavelength $W_2$, and the image appears against a stable background. The light may be employed in the reverse order to form an image with the novel composition of this invention. A pattern of light of wavelength $W_2$ produces a latent image by deactivating the composition in the irradiated areas. The latent image is then developed by light of wavelength $W_1$. Thus, the subject composition provides either a positive or a negative copy depending upon the order in which the wavelengths of light $W_1$ and $W_2$ are applied. In each case the image-forming and deactivating processes may be essentially dry.

Image-forming compositions and processes play an essential part in photography, thermography, and related arts dealing with mechanisms of writing, printing, and producing images with the aid of light, heat, electricity, or combinations of these activating influences. Currently available methods of image production impose numerous limitations which are costly, inconvenient, time consuming, and sometimes potentially hazardous. Classical photography, for example, although efficient in the utilization of light energy, employs expensive chemicals and papers, involves multi-step processing and drying, and requires a high skilled operator for consistently good results.

Thermography requires less operator skill and less expensive paper but produces images of poor quality which are easily destroyed. Mechanical printing, while inexpensive and rapid for repetitive printing, is decidedly more expensive and slow for sequential printing. In either the repetitive or sequential type of mechanical printing, a wet image is produced. Other photochemical image-forming systems involve the use of toxic chemicals such as ammonia, cyanide derivatives, or caustic materials. A new printing or imaging system which would overcome the limitations of the present methods would advance the art and be desirable.

Dry photochemical processes are known but they have certain disadvantages. For example, the dry photochemical process of U.S. Patent 3,079,258 suffers from the fact that the photosensitive composition remains sensitive to light. Photosensitive papers prepared according to the method of this patent cannot be handled in daylight. Similarly, the process of U.S. Patent 3,042,515 produces a dry photographic film. Depending upon the particular halocarbon used, the photographic film may remain photosensitive and cannot be used in ordinary daylight. In certain cases the photographic film may be deactivated by heat but such treatment serves merely to volatilize a toxic halogenated compound such as carbon tetrabromide and thereby produces a health hazard.

An attempt to solve the problem of deactivation is described in U.S.P. 3,082,086. This process depends upon the heat promoted reaction between an organic amine which is serving as a color generator and an anhydride to render the amine inert. Anhydrides, however, are subject to hydrolysis with atmospheric moisture, and the resultant films do not have the desired storage stability. Also the time of heating to cause deactivation is unduly long. In some cases the amides which result from reaction between the amine and the anhydride are subject to further oxidation to colored material as disclosed in British Patent 917,919. In any event, this process does not work with tertiary amines. A deactivating method for printing or imaging systems which would improve upon present methods would advance the art and be desirable.

It is, therefore, an object of this invention to provide a new and novel composition suitable for the production of visible images by exposure to light of a given wavelength $W_1$, but yet capable of being permanently deactivated toward color formation by light of a different wavelength $W_2$. Another object is to provide a latent reducing agent for a photooxidant in a photo-sensitive composition. A further object is to provide a novel, rapid process for deactivating a light-sensitive composition. A still further object is to provide a process that will provide either a positive or a negative copy depending upon the order in which the two wavelengths of light are applied.

These object are accomplished by the present invention as defined and described in the specification which follows:

This invention makes available a novel composition for forming an image and for preserving it by a dry, rapid, readily controlled procedure. Some of the advantages of this new composition and image-forming process of this invention over presently available image-forming systems are as follows.

Unlike photography, the process provided by the present novel composition is uniquely simple and at the same time rapid, and it may be conducted in a single apparatus or machine. In one embodiment, it requires no development step to produce a visible image. It may be dry and therefore does not require a wet processing treatment or complicated gadgetry to give the appearance of a dry system. It can produce directly either positive or negative copies.

Unlike xerography, it produces images in a variety of tones, ranging over the entire density scale, and requires no intricate image developing apparatus.

Unlike the thermography of commerce, the image can be deactivated so that it will not be destroyed by further exposure to the activating radiation. It also gives high-resolution images, in a variety of colors with excellent graduation of tone.

Unlike the diazo process, it is a dry process that does not require an objectionable material like ammonia, gives high resolution at greater speed, and produces either negatives or positives from negatives.

Unlike the products of U.S. Patents 2,927,025 and 3,079,258 which form images by a dry photochemical process, the products of the present invention can be deactivated toward further image formation or background color change.

Unlike the deactivation process of U.S.P. 3,042,515, it does not volatilize a toxic halocarbon.

Unlike the deactivation process of U.S.P. 3,082,086, the present deactivation process provides products with good storage stability and can be used to deactivate tertiary amines, an important class of color generators.

More specifically, the present invention is directed to (1) a photosensitive composition which contains in intimate association, essentially colorless, non-hygroscopic, interreactant progenitors of intensely color organic color-bodies, said progenitors being activated toward generation of intensely colored organic color-bodies by radiation of a given wavelength $W_1$ and being permanently deactivated toward generation of intensely colored organic color-bodies by radiation of a second but different wavelength $W_2$, said photosensitive composition producing a permanent, positive image when first irradiated in a graphic pattern with radiation of wavelength $W_1$ followed by radiation of wavelength $W_2$ but producing a permanent negative image when first irradiated in a graphic pattern with radiation of wavelength $W_2$ followed by radiation of wavelength $W_1$, said composition comprising (a) an essentially colorless oxidizable, nitrogen-containing organic color-generator which, when contained in said photosensitive composition, is stable to oxidation by atmospheric oxygen under normal room and storage conditions but which is capable of oxidation to an intensely color species, (b) a photooxidant which, when mixed with said oxidizable color-generator and irradiated with radiation of wavelength of about 2000 A. to about 4200 A. will, without further activation, oxidize said color-generator to said intensely color species, and as an essential part of the composition.

(c) a redox couple which consists of (1) a reductant component which is capable of undergoing a photo-initiated redox reaction with the oxidant component and (2) said oxidant component which, when activated by the radiation of wavelength $W_2$, undergoes with the reductant component a photo-initiated redox reaction, said photo-initiated redox reaction between the different components of the couple forming a reducing agent which prevents photo-oxidative color-formation by radiation of wavelength $W_1$, said oxidant component being further characterized in that it undergoes little, if any, photo-oxidative reaction with said color generator regardless of whether the impinging radiation is of wavelength $W_1$ or wavelength $W_2$.

Other more specific embodiments include:

(2) a composition according to said (1) wherein the organic color generator is an aminotriarylmethane containing at least two p-dialkylamino-substituted phenyl groups having as a substituent ortho to the methane carbon atom an alkyl, alkoxy or halogen, the photooxidant is a 2,2′(o-substituted phenyl)-4,4′,5,5′-tetraphenyl biimidazole, the oxidant component of the redox couple is a quinone and the reductant component of the redox couple is a polyether;

(3) the process of producing an image having a light-stable background by irradiating in a stepwise manner the composition as defined in (1) with light of two different wavelengths between 2000 A. and 5500 A., at least one of said wavelengths of light being applied in a graphic pattern;

(4) a light-sensitive material comprising a supporting base carrying a light-sensitive composition defined in (1);

(5) a light-sensitive material comprising a plastic film containing the light-sensitive composition defined in (1); and (6) paper treated with a composition defined in (1).

Many types of organic compounds function as organic color-generators in the invention composition. All are characterized as being essentially colorless, containing nitrogen, being stable to oxidation under normal storage conditions in the photosensitive composition and being capable of producing a color in a photooxidative process in the presence of a photo-oxidant. The process may be a simple oxidation of the colorless compound to a colored species. The oxidation may initially produce a reactive intermediate which then undergoes a further reaction with a second component of the color-generator to produce the final colored species. In some cases the reactive intermediate combines with the photo-oxidant to produce a colored species. Mixtures of color-generators may be used. These color generation processes, and the compounds which are adapted for them, are discussed in detail below.

Four different types of color generators are distinguished.

(A) Leuco form of dyes.—One type of color-generator which may form part of the light-sensitive composition is the reduced form of the dye having, in most cases, one or two hydrogen atoms, the removal of which together with one or two electrons produces a dye. Since the leuco form of the dye is essentially colorless, or in some instances it may be of a different color or of a less intense shade than the parent dye, it provides a means of producing an image when the leuco form is oxidized to the dye. This oxidation is accomplished by irradiating an intimate admixture of the organic color-generator and a photo-oxidant discussed below. A pattern of light of a wavelength of from about 2000 A. to about 4200 A. initiates in the irradiated area a redox reaction between the organic color-generator and the photo-oxidant. The result is the removal of one or two readily removable hydrogen atoms, depending on the structure of the leuco form of the particular dye chosen, with the production of a colored image against a background of unirradiated and, therefore, unchanged material. Representative dyes in the leuco form which are operative according to the invention include:

(a) Aminotriarylmethanes, such as
- bis(4-benzylethylaminophenyl)(2-chlorophenyl)methane,
- bis(4-dimethylaminophenyl)(4-dimethylamino-1-naphthyl)methane,
- bis(p-dimethylaminophenyl)(1,3,3-trimethyl-2-indolinylidenemethyl)methane, and
- bis(4-dipropylaminophenyl)(o-fluorophenyl)methane.

Because of their superior resistance to color development due to air oxidation, the preferred species of aminotriarylmethanes have either an alkyl group, an alkoxy group or a halogen in the position ortho to the methane carbon in at least two of the aryl groups. Specific examples of this preferred species include:

bis(4-dimethylamino-o-tolyl)(o-chlorophenyl)methane,
bis(4-diethylamino-2-methoxyphenyl)(4-nitrophenyl)methane,
tris(4-dimethylamino-2-chlorophenyl)methane, bis(4-dimethylamino-o-tolyl)(2-bromophenyl)methane,
bis(4-diethylamino-o-tolyl)(4-benzylthiophenyl)methane, and
bis4-diethylamino-o-tolyl)-2-thienylmethane.

(b) Aminoxanthenes, such as
3-amino-6-dimethylamino-2-methyl-9-(o-chlorophenyl)xanthene,
3,6-bis(diethylamino)-9-(o-chlorophenyl)xanthene,
3,6-bis(dimethylamino)-9-(o-methoxycarbonylphenyl)-xanthene.

(c) Aminothioxanthenes, such as
3,6-bis(dimethylamino)-9-(o-methoxycarbonylphenyl)thioxanthene,
3,6-dianilino-9-(o-ethoxycarbonylphenyl)-thioxanthene.

(d) Amino-9,10-dihydroacridines, such as
3,6-bis(benzylamino)-9,10-dihydro-9-methylacridine,
3,6-diamino-9-hexyl-9,10-dihydroacridine.

(e) Aminophenoxazines, such as
5-benzylamino-9-diethylamino-benzo[a]phenoxazine
3,7-bis(diethylamino)phenoxazine.

(f) Aminophenothiazines, such as
3,7-bis(dimethylamino)-4-nitrophenothiazine,
3,7-bis[N-ethyl-N-(m-sulfobenzyl)amino] phenothiazine, monosodium salt,
3,7-diaminophenothiazine.

(g) Aminodihydrophenazines, such as
3,7-bis(benzylethylamino)-5,10-dihydro-5-phenylphenazine,
3,7-bis(dimethylamino)-5-(p-chlorophenyl)-5,10-dihydrophenazine,
3,7-diamino-5,10-dihydro-5-methylphenazine,
3,7-diamino-5,10-dihydro-2,5,8-trimethylphenazine.

(h) Aminodiphenylmethanes, such as
1,4-bis[bis-(p-diethylaminophenyl)methyl]piperazine,
bis(p-diethylaminophenyl)-1-benzotriazolylmethane,
bis(p-diethylaminophenyl)(2,4-dichloroanilino)methane,
bis(p-diethylaminophenyl)(octadecylamino)methane,
1,1-bis(p-dimethylaminophenyl)ethane.

(i) Aminohydrocinnamic acids (cyanoethanes), such as
α-cyano-4-dimethylaminohydrocinnamamide,
α,β-dicyano-4-dimethylaminohydrocinnamamide,
α,β-dicyano-4-(p-chloroanilinohydrocinnamic acid, methyl ester,
p-(2,2-dicyanoethyl)-N,N-dimethylamiline,
p-(1,2,2-tricyanoethyl)-N,N-dimethylaniline.

(j) Leucoindigoid dyes, such as
7,7′-diamino-5,5′-dichloroleucothioindigo,
6,6′-dichloro-4-methylleucothioindigo,
7,7′-dimethylleucoindigo,
5,5′-disulfoleucoindigo, disodium salt,
5,5′,7,7′-tetrachloroleucoindigo.

(k) 1,4-diamino-2,3-dihydroanthraquinones, such as
1,4-bis(ethylamino)2,3-dihydroanthraquinone,
1-amino-4-methoxyanilino-2,3-dihydroanthraquinone,
1,4-diamino-2,3-dihydroanthraquinone,
1-p-(2-hydroxyethylamino)anilino-4-methylamino-2,3-dihydroanthraquinone.

It is not essential that the organic color-generator have a hydrogen which is removed by oxidation to form the colored species. One class of oxidizable compounds which do not contain removable hydrogens consists of acyl derivatives of leuco dyes which contain a basic NH group.

Suitable compounds which have a basic NH group and which form amides when acylated include dihydrophenazines, phenothiazines, and phenoxazines. Specific examples of such compounds are 10-acetyl-3,7-bis(dimethylamino)-phenothiazine, 10-(p-chlorobenzoyl)-3,7-bis(diethylamino)-phenothiazine, 5,10-dihydro-10-(p-nitrobenzoyl)-5-phenyl-3,7-bis(phenylethylamino)phenazine, and 10-(p-benzoyal)-3,7-bis(naphthylmethylamino)phenoxazine.

Also there are certain compounds related to the triarylmethane leuco dyes which contain no hydrogen atoms that are removed during the oxidative color formation, but which, nevertheless, are photooxidized to a colored compound. Examples of such compounds are tris-(p-dimethylaminophenyl)-benzylthiomethane, 1-tris(p-diethylaminophenyl)methyl-2-phenylhydrazine, tris(4-diethylamino-o-tolyl)ethoxycarbonylmethane, bis(4-dipropylamino-o-tolyl)(o-fluorophenyl)butoxycarbonylmethane and bis[tris(4-diethylamino-o-tolyl)methyl]-disulfide.

The organic amines that can be oxidized to a colored species but do not fall into the groups of the leuco dyes discussed above are disclosed in U.S. Patents, 3,042,515 and 3,042,517. Representative examples of this type of amine are 4,4′-ethylenedianiline, diphenylamine, N,N-dimethylaniline, 4,4′-methylenedianiline, triphenylamine, and N-vinylcarbazole.

Certain hydrazones and acyl derivatives of these hydrazones can be oxidized to diazonium compounds as described by Hunig and Fritsch, Ann. 609, 143 (1957). It has been found that this type of hydrazone can be photooxidized to a diazonium compound. The resultant diazonium compound will then couple with any of a large number of coupling agents to produce an azo dye.

Compounds which are suitable for photooxidation to the diazo component of the color-generator are disclosed in U.S.P. 3,076,721. Representative examples are:

3-methyl-2-benzothiazolinone hydrazone,
6-chloro-3-methyl-2-benzothiazolinone hydrazone, and
6-methoxy-3-methyl-2-benzothiazolinone hydrazone.

The acylated hydrazones are more difficult to oxidize than the corresponding non-acylated hydrazones. As a result, they have greater storage stability. Representative acylated hydrazones which are suitable for photooxidation to the diazo component of the color-generator are:

3-methyl-2-benzothiazolinone acetylhydrazone,
3-methyl-2-benzothiazolinone p-tolylsulfonylhydrazone,
3-methyl-2-benzoselenazolinone propionylhydrazone,
3-ethyl-2-benzoxazolinone phenylsulfonylhydrazone,
5-methoxy-1,3-dimethyl-2-benzimidazolinone benzoylhydrazone,
1-methylcarbostyril phenoxyacetylhydrazone.

Compounds which may be used as the coupling component of the color-generator include:

N,N-diethylaniline,
N,N-dimethyl-m-toluidine, and
N-(2-cyanoethyl)-N-methyl-2-naphthylamine.

In place of a separate hydrazone and coupling agent as already described, it is possible to use a composite hydrazone-coupler compound. The composite compounds supply both the diazo component and the coupler component, and thus provide the entire color-generator in one compound. Specific examples of such composite compounds are 3-methyl-2-benzothiazolinone 1-hydroxy-2-naphthoylhydrazone and 3-methyl-2-benzothiazolinone 5-oxo-1-phenyl-3-pyrazolylcarbonylhydrazone.

In addition to the aforementioned amines, other types of coupler can be used provided certain selection rules are followed. Specific examples of the other couplers are active methylene compounds, such as acetoacetamide and 2-thenoylacetonitrile, and phenolic compounds such as m-cresol, 1-naphthol, 6-sulfamido-2-naphthol and even hydroquinone. It is essential that the coupling component be selected so that the hydrazone is photo-oxidized in preference to the coupling component. If the coupling component is a weak reducing agent not only can most hydrazones be used, but even difficultly photo-oxidized compounds such as acylated hydrazones can be used. When the acylated hydrazones are employed, the photo-oxidant should be a strong oxidizing agent. If the coupling component is a moderately strong reducing agent then the acylated hydrazones usually cannot be employed. If the coupling component is also a potent reducing agent, such as hydroquinone, it is necessary to select a hydrazone which is readily oxidized.

It is also essential to exercise care in selecting the hydrazone and reducing agent produced by irradiation of the redox couple (see discussion below). The components must be chosen so that the photochemically produced reducing agent is photo-oxidized in preference to the hydrazone. With difficulty oxidized compounds such as the acylated hydrazones there usually is no problem. If the hydrazone is not acylated, it usually is necessary that the redox couple produce a strong reducing agent.

An aromatic diamine in combination with a coupling agent undergoes an oxidative condensation reaction which leads to azomethine and indoaniline dyes. More particularly, the reactants in this condensation are N,N-dialkylphenylenediamines and couplers such as active methylene compounds, anilines and phenolic compounds. The chemistry of these oxidative coupling reactions is reviewed by Vittum et al. in J. Phot. Sci., 2, 81 (1954) and ibid. 6, 157 (1958). It has been found that these oxidative condensation reactions are adaptable to photochemical processes and, furthermore, that such photosensitive compositions can be deactivated by the method of the present invention. Examples of N,N - dialkylphenylenediamines which are operative in the present process are N,N-dimethyl-p-phenylenediamine and N,N-dimethyltoluene-2,5-diamine. Suitable couplers include 2 - acetyl-4′-chloroacetanilide, 2-benzoyl-2′-methoxyacetanilide, o-ethylphenol, 2-naphthol, 7-acetylamino-1-naphthol, N,N-dimethylaniline, and N,N-diethyl-m-toluidine.

Many color-generators perform best when an acid is present. Color-generators which contain amino groups can bind the acid by salt formation. The amount of acid is usually from 0.33 mole to 1 mole per mole of amino nitrogen. Representative acids are hydrochloric, hydrobromic, sulfuric, phosphoric, acetic, oxalic, and p-toluenesulfonic. Also useful are acids in the "Lewis" sense such as zinc chloride, zinc bromide, and stannic chloride.

Many classes of compounds function as photo-oxidants in the light-sensitive compositions of the invention. Each of the compounds is characterized by having the ability to produce a permanent color when mixed with an organic color generator as discussed above and irradiated with a particular wavelength, $W_1$, of light of from about 2000 A. to about 4200 A. The exact means by which photo-oxidants oxidize color-generators is perhaps not fully understood for all photo-oxidants. Two classifications of photo-oxidants are proposed below but the invention gives the stated results whether or not this is the true theory involved.

The mechanism by which a particular photo-oxidant functions depends not only upon the particular photo-oxidant but also upon the particular color-generator and the wavelength of the activating light, $W_1$. Based upon the mechanism by which they act as photo-oxidants, the photo-oxidants may be divided into two classes—initiators and acceptors. Some photo-oxidants, however, can function as either an initiator or an acceptor depending upon the wavelength of the activating light. Most photo-oxidants have a preferred mode of operation. Also some color-generators are more efficient with a particular type of photo-oxidant and care must sometimes be exercised in selecting these two components of the composition. In addition, the pH of the system is a factor, and a change in pH may change the mechanism by which the photo-oxidant functions. Acidic compositions are usually preferred.

An initiator type of photo-oxidant absorbs the activating light and dissociates into free radicals. These free radicals are the active oxidizing agent which reacts with the color-generator by an oxidation-reduction mechanism to produce the colored species.

An acceptor type of photo-oxidant generally absorbs none of the activating light. If it does absorb some of the activating radiation, the absorption is dissipated in a non-color-forming manner and does not lead to color generation. The activating radiation is, instead, absorbed by the color-generator to produce a photo-excited molecule which then undergoes an oxidation-reduction reaction with the acceptor photo-oxidant. The term "acceptor" is applied because the photo-oxidant accepts an electron ejected by the color-generator. It is generally believed that the color-generator ejects the electron (Lewis and Bigeleisen, J. Am. Chem. Soc., 65, 2419 (1943)). These ejected electrons then react very rapidly with an acceptor and the reaction is rendered irreversible.

A suitable criterion for judging whether a photo-oxidant is an acceptor or an initiator is the wavelength of light which causes color formation in the light-sensitive composition. This is easily determined by the use of appropriate filters. This wavelength usually will coincide with the absorption maximum of either the color-generator or the photo-oxidant. For example, nearly all leuco triarylmethane dyes that contain a dialkylamino group have a strong absorption band at about 2700 A. and a weaker band, frequently appearing in the spectrum as a sholuder, at about 3100 A. Light having a wavelength from about 2500 A. to about 3200 A. is, therefore, effective in causing the oxidation of these leuco dyes in the presence of an acceptor type photo-oxidant.

Examples of classes of photo-oxidants which function by the initiator mechanism are the biimidazoles and the tetraarylhydrazines. Specific examples are as follows:

A. Biimidazoles:
- 2,2′-bis(p-methoxyphenyl)-4,4′,5,5′-tetraphenylbiimidazole,
- 2,2′-bis(p-cyanophenyl)-4,4′,5,5′-tetrakis(p-methoxyphenyl)biimidazole,
- 2,2′-bis(m-nitrophenyl)-4,4′,5,5′-tetrakis(2,4-dimethoxyphenyl)biimidazole,
- 2,2′-bis(3,4,5-trimethylphenyl)-4,4′,5,5′-tetrakis(p-methylthiophenyl)biimidazole,
- 2,2′-bis(o-methoxyphenyl)-4,4′,5,5′-tetraphenylbiimidazole,
- 2,2′-bis(2,4-dichlorophenyl)-4,4′,5,5′-tetrakis(p methoxyphenyl)biimidazole,
- 2,2′-bis(o-bromophenyl)-4,4′,5,5′-tetraphenylbiimidazole, and
- 2,2′-bis(2,4-dimethoxyphenyl)-4,4′,5,5′-tetraphenylbiimidazole.

The preferred hexaarylbiimidazoles of this invention are 2,2′,4,4′,5,5′-hexaphenylbiimidazoles having in the 2-, 2′-phenyl rings an ortho substituent that is chlorine, bromine, fluorine, $C_1$–$C_6$ alkoxy, or $C_1$–$C_6$ alkyl. A particularly preferred biimidazole is 2,2′-bis(o-chlorophenyl)-4,4′,5,5′-tetraphenylbiimidazole.

B. Tetraarylhydrazines:
- tetraphenylhydrazine,
- tetra-p-tolylhydrazine, and
- tetrakis(p-methoxyphenyl)hydrazine.

Examples of classes of photo-oxidants which function by the acceptor type of mechanism are given below along with specific examples of each class of photo-oxidant.

C. Tetraacylhydrazines:
- tetraacetylhydrazine,
- tetraformylhydrazine, and
- tetrabenzoylhydrazine.

D. Diacylaminobenzotriazoles:
- 1-diacetylaminobenzotriazole, and
- 1-dibenzoylamino-5-chlorobenzotriazole.

E. Benzothiazole disulfides:
- bis(2-benzothiazolyl)disulfide, and
- bis(6-methoxy-2-benzothiazolyl)disulfide.

F. Triacylhydroxylamines:
N,N,O-triacetylhydroxylamine,
N,N,O-tripropionylhydroxylamine,
N,N,O-tribenzoylhydroxylamine, and
N,N,O-tris-(p-chlorobenzoyl)hydroxylamine.

G. Diacylaminotriazoles:
1-diacetylamino-3,5-diphenyl-1H-1,2,4-triazole,
1 - dipropionylamino - 3,5 - diphenyl - 1H - 1,2,4-triazole, and
1-dibenzoylamino-4,5-diphenyl-1H-1,2,3-triazole.

H. Alkylidene-2,5-cyclohexadien-1-ones:
2,6 - dimethyl - 4 - (1,1,3,3 - tetrafluoro - 1,3 - dichloroisopropylidene)-2,5-cyclohexadien-1-one.

I. Selected polymers:
polymethacrylaldehyde

J. Diacylaminopyrazoles:
1-diacetylaminopyrazole, and
1-dipropionylamino-4-chloropyrazole.

The diacylaminopyrazoles are prepared by reacting pyrazole or pyrazole substituted in one or more of the 3, 4, or 5-positions with alkyl, halogen, aryl, nitro or cyano groups with hydroxylamino-O-sulfonic acid in aqueous sodium hydroxide solution to form a 1-aminopyrazole. The 1-aminopyrazole is then reacted with the necessary acid anhydride or acid halide to form the corresponding 1-diacylaminopyrazole.

K. Bibenzotriazoles:
1,2′-bibenzotriazole,
5,5′-dichloro-1,1′-bibenzotriazole, and
5,5′-dimethyl-1,1′-bibenzotriazole.

The 1,2′-bibenzotriazole and benzo ring substituted 1,2′-bibenzotriazoles except those having a nitro substituent are prepared by reacting a solution of the benzotriazole in aqueous sodium hydroxide with hydroxylamino-O-sulfonic acid to form a corresponding 2-aminobenzotriazole which is separated from its isomers by fractional crystallization. The 2-aminobenzotriazole is then mixed with o-chloronitrobenzene and heated to 160° to 205° C. for 5 hours in the presence of anhydrous sodium acetate to produce 2-(o-nitrophenylamino)benzotriazole. The product is isolated by filtration and recrystallized from ethanol. The 2-(nitrophenylamino)benzotriazole is catalytically reduced with hydrogen to 2-(o-aminophenylamino)benzotriazole which is diazotized in the usual way with nitrous acid to convert the primary amine to a diazonium salt which couples with the secondary amino group to form a cyclic triazole and yield a 1,2′-bibenzotriazole.

Nitro derivatives of 1,2′-bibenzotriazoles cannot be prepared by the above procedure because the reduction of the nitro group prior to cyclization destroys any other nitro groups that are present. It is, therefore, necessary that the nitro derivatives of 1,2′-bibenzotriazole be prepared by treatment of the bibenzotriazole with nitric acid.

The 1,1′-bibenzotriazole and derivatives are prepared by tetraazotizing with nitrous acid o,o′-diaminoazobenzene or its derivatives to bisdiazonium salts. The resultant salts are then reduced to the 1,1′-bibenzotriazole with sulfur dioxide. Derivatives bearing such substituents as alkyl, halogen, sulfo, nitro, or alkanamido are prepared from the correspondingly substituted o,o′-diaminoazobenzene.

A large class of photo-oxidants which may be utilized is the halogen compounds disclosed in U.S.P. 3,042,515. The most useful halogen compounds have a bond dissociation energy to produce a first free radical of not less than about 40 kilogram calories per mol. It is disclosed in U.S. Patent 3,056,673, that the spectral response to these halogenated photo-oxidants is, among other things, a function of the particular halogen compound which is chosen. Iodo compounds absorb at relatively long wavelengths, bromo compounds absorb at intermediate wavelengths and chloro compounds absorb at short wavelengths. With a source of ultraviolet light such as a sun lamp the iodo compounds will function as initiators while the chloro and bromo compounds function as acceptors. The operative mechanism may be changed by utilizing another light source having a different spectral distribution. Changing the color-generator and the spectral region in which it absorbs, also can change the mechanism by which these halogenated photo-oxidants function.

Specific examples of this class of photo-oxidant are:

L. Halogen compounds:
carbon tetraiodide,
iodoform,
carbon tetrabromide,
1,2,3,4-tetrabromobutane,
hexachloroethane, and
1,2,3,4-tetrachlorobenzene.

A composition which comprises a photo-oxidant and an organic color-generator, as described above, is photosensitive and produces an image when irradiated with a graphic pattern of light having a wavelength $W_1$. This image, however, is not permanent because the unirradiated areas of the image will become colored during usage if the ambient light contains any light whatsoever of wavelength $W_1$.

A means to deactivate the photosensitive composition is, therefore, needed so that the composition is no longer photosensitive. If the composition remains photosensitive it will be acted upon by ambient light to alter or destroy the image. A deactivating means has been found. It consists of including in the photosensitive composition a redox couple which produces a reducing agent when irradiated with light of wavelength $W_2$ which is different from $W_1$.

This deactivation process may be used in two different ways. In the first, the photosensitive composition is irradiated with a graphic pattern of light of wavelength $W_1$ to produce an image. This image is then deactivated by irradiation with light of wavelength $W_2$. This irradiation with light of wavelength $W_2$ may be a brief exposure at a high intensity. Or, if the ambient light conditions following image formation provide some light of wavelength $W_2$, it may be advantageous to allow the deactivation to occur during normal usage of the material upon which the image has been formed. In this case no separate deactivation step or equipment is required.

In the second procedure the reverse order of light exposure is followed. Irradiation with a pattern of light of wavelength $W_2$ produces a latent image, i.e., those areas upon which $W_2$ impinges are deactivated toward color formation by light of wavelength $W_1$. The resultant latent image is then developed into a visible image by irradiation with light of wavelength $W_1$.

The images produced by these two different procedures can be formed so that they have a positive-negative relation. Suppose a substrate which bears printed or written characters is transparent to light of wavelength $W_1$ and reflects light of wavelength $W_2$. Irradiation with light of wavelength $W_1$ through the substrate bearing the characters will produce a negative copy on a film containing the photosensitive composition. The negative copy can now be deactivated by direct irradiation with light of wavelength $W_2$. If, however, light of wavelength $W_2$ is reflected from the substrate onto a film containing the photosensitive composition, and the film is subsequently developed wtih light of wavelength $W_1$, a positive copy is obtained. Thus, the same printed or patterned material can be copied in either positive or negative form depending on the order in which the two different wavelengths of light, $W_1$ and $W_2$, are applied.

The redox couple must fill three requirements. First, it must not function as a reducing agent with respect to the photo-oxidant, otherwise it would interfere with the color-forming reaction. Second, the couple must undergo a reaction initiated by light of wavelength $W_2$ to produce a reducing agent. Third, this photochemically produced reducing agent must readily deactivate the photosensitive system by preventing further color formation. The deactivation will be achieved if the photochemically produced reducing agent is a stronger reducing agent than the color-generator.

A. Oxidant component of redox couple.—A variety of components will serve as the oxidant component of the redox couple. It usually is an organic compound but can be an inorganic one. Quinones are the preferred class of oxidant components. Representative quinones are:

(a) Quinones:
- 1,2-naphthoquinone,
- 2,5-diethoxy-p-benzoquinone,
- 3-acetylphenanthrenequinone,
- 1,6-pyrenequinone,
- 1,8-pyrenequinone,
- 4-nitro-9,10-phenanthrenequinone, and
- 2-methylanthraquinone.

(b) Ketones:
- 1-H-benzonaphthen-1-one,
- 6-acetyl-1H-benzonaphthene-1,3(2H)-dione,
- anthrone, and
- 6-benzoyl-8-chloro-1H-benzonaphthene-1,3(2H)-dione.

Other organic oxidant components contain nitrogen, frequently in a carbon-nitrogen double bond structure. Specific examples of different classes of nitrogen-containing oxidant components are:

(c) Phenazines:
- phenazine,
- 1,4-dimethylphenazine,
- 2,3-dimethoxyphenazine, and
- 1,4-dibenzylphenazine.

(d) Acridines:
- 9-phenylacridine
- 9-(2,4-dichlorophenyl)acridine,
- 2-methyl-9-phenylacridine, and
- 2-ethoxy-9-phenylacridine.

(e) Phenoxazinones:
- 2-amino-3H-phenoxazin-3-one,
- 2-amino-7-methyl-3H-phenoxazin-3-one,
- 2-amino-7-phenyl-3H-phenoxazin-3-one, and
- 2-dimethylamino-3H-phenoxazin-3-one.

(f) Quinolines:
- quinoline,
- 4-benzylquinoline,
- 4-methylquinoline, and
- 8-phenylquinoline.

(g) Phenanthrolines:
- 1,10-phenanthroline,
- 3,4-dimethyl-1,10-phenanthroline,
- 3,4,8-trimethyl-1,10-phenanthroline, and
- 3,4,7,8-tetramethyl-1,10-phenanthroline.

(h) Isoquinolines:
- isoquinoline
- 3-ethylisoquinoline
- 3-methylisoquinoline, and
- 6-methylisoquinoline.

(i) Anils:
- 10-phenylimino-9-anthrone, and
- 10-p-tolylimino-9-anthrone.

The above organic oxidant components of the redox couple are characterized by having a reducible carbon-oxygen or carbon-nitrogen double bond.

In addition to the above organic compounds, polyvalent metal compounds will function as satisfactory oxidant components for the redox couple. Ferric compounds are an example of such polyvalent metal compounds. When a photoreducible ferric compound is irradiated with light of wavelength $W_2$ it is reduced to a ferrous compound by the reductant component of the couple. The ferrous compound then prevents further color formation by the photo-oxidant and color-generator. Specific examples of operable ferric compounds are ferric chloride, ferric acetate and ferric ammonium citrate.

B. Reductant component of redox couple.—The reductant component of the redox couple reacts with the oxidant component of the couple. In this process the reductant component becomes oxidized, usually by loss of a hydrogen atom. Hydrogen-containing organic compounds which are effective chain transfer agents in polymerization reactions are usually effective reductant components of the redox couple. Sometimes it is not even necessary to add a separate compound for the reductant component because small amounts of retained solvent or some component of the substrate or the substrate itself will function as the reductant component.

Examples of classes of compounds which will function as the reductant component of the redox couple are:

(a) Ethers:
- diethyl ether,
- dioxane,
- polyethylene glycol of M.W. 600,
- polypropylene glycol of M.W. 1000, and
- polytetramethyleneether glycol of M.W. 1000.

(b) Esters:
- methoxyethyl terephthalate,
- cyclohexyl adipate, and
- 1,3-cyclohexylene diacetate.

(c) Alcohols:
- isobutanol,
- isooctanol,
- cyclohexanol,
- 1,2,3,4-tetrahydro-1,4-naphthalenediol,
- furfuryl alcohol,
- diethanolamine, and
- triethanolamine.

(d) Compounds containing Allylic or Benzylic Hydrogen Cumene:
- 1,4-dihydronaphthalene,
- p-cymene, and
- tetralin.

(e) Acetals:
- benzaldehyde dioctylacetal,
- terephthalaldehyde cyclic bis(ethyleneacetal), and
- terephthalaldehyde bis(dioctylacetal).

(f) Aldehydes:
- benzaldehyde,
- m-chlorobenzaldehyde, and
- terephthalaldehyde.

(g) Amides:
- adipamide,
- N,N-diethylformamide,
- 2-imidazolidinone,
- 2-oxohexamethylenimine, and
- succinamide.

(h) Miscellaneous:
- triphenyl tin hydride,
- dioctylphosphite, and
- triphenylsilane.

Certain phenolic compounds frequently used as antioxidants will also function as the reductant component of the redox couple. An example is 2,6-di-t-butyl-p-cresol. A small amount of this compound is sometimes added as an antioxidant to many different materials of commerce, such as, for example, some brands of polyethylene glycol. These polyethylene glycols owe some, but not all, of their activity as reductant componets of the redox couple to their content of small amounts of 2,6-di-t-butyl-p-cresol.

The concentration of this type of phenol must be carefully controlled because it has a tendency to decrease the efficiency of the color-forming reaction.

When the reductant component is a low molecular weight compound volatility is sometimes a problem. If paper is the substrate, it may even be necessary to use sufficient reductant component to keep the paper saturated. Since this problem is largely eliminated with less volatile materials, the preferred reductant components are of substantial moleclular weight. These higher molecular weight materials may also serve useful functions as component solvents and as film plasticizers.

In special cases the oxidant and reductant portions of the redox couple can be combined in the same molecule, i.e., one molecule undergoes an internal oxidation-reduction reaction. The requirements for this single compound are the same as for the individual components. It must initially be inactive as a reducing agent and must undergo a redox reaction initiated by light of wavelength $W_2$ to produce a reducing agent.

One group of compounds which are one component redox couples comprises compounds that have an active hydrogen held spatially close to a quinone carbonyl group. A specific example is 1,4-bis(2-methoxyethyl) anthraquinone.

A general procedure for evaluating both oxidant and reductant components of the redox couple is given in the examples.

Activating light.—The wavelength of light $W_1$ is usually between 2000 and about 4200 A. and $W_2$ between 2000 and 5500 A. In some cases the activating radiations may be extended to longer wavelengths by adding certain dyes to the photo-sensitive composition. Such dyes function as sensitizers as is well known in the art. See, for instance, C. E. Kenneth Mees, The Theory of the Photographic Process, The Macmillan Company, 1952, page 961 et seq. In general, the light of wavelength $W_2$ is absorbed by the oxidant component of the redox couple. Light of wavelength $W_1$ is usually absorbed by the photo-oxidant if the photo-oxidant is an initiator. Thus. the light absorption of the oxidant component of the redox couple and of either the photo-oxidant or the color-generator usually determine the wavelengths $W_1$ and $W_2$. Light of wavelengths $W_1$ and $W_2$ need not be monochromatic. In fact, bands several hundred angstrom units in width are frequently desirable. Suitable bands of light are readily obtained by the use of filters. Cut-off filters, which transmit all light beyond a certain wavelength, are useful, particularly when the transmitted wavelengths of light are on the edge of the useful spectral region. Band-pass filters, which transmit only a particular band of light, are also useful. They may be either the interference type or the type based on the selective transmission of the filter material.

Since most compounds have rather broad light absorption bands and since these same absorption bands frequently determine the wavelengths $W_1$ and $W_2$, there is a possibility of overlap between $W_1$ and $W_2$. This overlap is sometimes undesirable because it can reduce both the photographic speed and the ultimate color density. In some cases, therefore, it is desirable that wavelengths $W_1$ and $W_2$ be separated by at least several hundred angstrom units. A small amount of overlap is frequently unavoidable. For example, the preferred photo-oxidants, the biimidazoles, have a very broad absorption band centered at about 2700 A. and extending to about 3100 A. From about 3100 to about 4300 A. there is small, gradually diminishing absorption. For maximum utilization of light energy, $W_1$ should be between 2400 and 3000 A. Any wavelength, however, up to 4300 A. can be utilized to initiate the color-forming reaction without resorting to the addition of sensitizing compounds. The same 3100 A. to 4300 A. region can also be used for the deactivation reaction, and it thereby corresponds to $W_2$. For equimolar concentrations of oxidant component and biimidazole, the oxidant component should have a higher extinction coefficient at wavelength $W_2$ than does the biimidazole, if the deactivation reaction is to be achieved without undue coloration. Small amounts of overlap produce no undesirable results and in some cases can even result in more efficient deactivation.

In contrast, if the oxidant component of the redox couple trails its effective light absorption, i.e., $W_2$, into the main absorption band of the biimidazole, i.e., $W_1$, the result will be reduction in both the photographic speed and the ultimate color density. Control of the absorbance can be achieved by paying careful attention to the concentrations of the various light absorbing species. If the quantum yields of the two primary reactions are known, corresponding adjustment in the concentrations of the light absorbing species should also be made.

It is frequently desirable to evaluate by actual test the various components of the photosensitive composition, and to determine the stoichiometry of the reactions involved and the wavelengths of light $W_1$ and $W_2$ which cause these reactions. A suitable test is as follows.

A composition consisting of photo-oxidant, color-generator and redox couple is either applied to a suitable substrate, such as paper, or is mixed with a solution of a suitable polymer and cast into a film. Two filters, each passing light of a different wavelength, are arranged so that each filter covers one half of the film or impregnated paper. The film or impregnated paper is then irradiated through the filters with a light source which emits light including those wavelengths passed by the filters. The positions of the filters are reversed and the irradiation is repeated for exactly the same length of time. If both halves of the impregnated paper or film now have the same depth of shade, no deactivation has occurred. If the two halves are of different intensities, deactivation has occurred. In the half which is of greater intensity, the wavelength of light applied first will have caused color formation, i.e., it will have been colored by light of wavelength $W_1$. In that half which is of lesser intensity, the wavelength of light applied first will have caused deactivation, i.e., it will have been deactivated by light of wavelength $W_2$. Larger differences of color between the two halves, correspond to greater selectivity between the two wavelengths of light, $W_1$ and $W_2$. This procedure is described in detail in the examples.

The wavelength $W_1$, of the radiation which activates color formation varies with both the photo-oxidant and the color-generator employed. Similarly, the wavelength $W_2$, of the radiation which deactivates the photosensitive composition varies with the components of the redox couple but primarily depends upon the oxidant component. In the absence of sensitizers, the wavelength $W_1$ will be within the range 2000 to 4200 A., and wavelength $W_2$ will be within the range 2000 to 5500 A. Suitable means for providing such radiation include sunlamps, electronic flash guns, germicidal lamps, and ultraviolet lamps providing specifically light of long wavelength (3663 A.), ultraviolet lamps providing light of short wavelength (2537 A.), incandescent lamps, and sunlight.

Ratio of reactants.—The amount of color-generator determines the depth of color which will be obtained with a given photosensitive composition. The photo-oxidant is, therefore, measured in proportion to the color-generator. Many color generators, such as the leuco triarylmethane dyes, will require a molar equivalent of photo-oxidant for complete conversion to the colored form. Less than molar equivalents of photo-oxidants are operable but wasteful of color-generator. Thus, ratios of photo-oxidant to color-generator from about 1:10 to about 100:1 are operable. The preferred range is from 1:1 to 2:1.

The reductant component of the redox couple is frequently employed in large excess over the oxidant component of the redox couple. This practice is particularly followed when it is desired that the reductant component also function as a component solvent or as a film plasticizer. Only in those few cases where the reductant component is quite active, such as 2,6-di-t-butyl-p-cresol, it is necessary to restrict the amount of the reductant component. When a composition is deactivated by exposure to ambient light for an extended period of time, the oxidant component probably goes through several redox cycles. Thus, the limiting amount of the redox couple is usually determined by the oxidant component rather than by the reductant component.

The oxidant component of the redox couple is measured in proportion to the photo-oxidant. Many, but not all, photo-oxidants require an equivalent molar amount of oxidant component of the redox couple. An insufficiency of oxidant component of the redox couple can produce incomplete deactivation while large excess may unduly lower the photographic speed of the composition. The optimum amount can best be determined by the general procedure given in the examples. The operable ratio of photo-oxidant to oxidant component of the redox couple is from 100:1 to 1:20 and the preferred ratio is from 5:1 to 1:2.

Substrate.—The photosensitive compositions of the present invention may be utilized as a coating, impregnant or additive for various substrates. Frequently, the substrates will be materials used in the graphic arts and in decorative applications. The substrates may be rigid or flexible; solid, porous or even liquid; either opaque or transparent to ultraviolet light. They may include paper ranging from tissue paper to heavy cardboard; films of plastics and polymeric materials such as regenerated cellulose, cellulose acetate, cellulose nitrate, polyethylene, polymethyl methacrylate, polyvinyl chloride; textile fabrics; glass; wood and metals. Opaque as well as transparent substrates may be used. Substrates in which the photosensitive composition is dissolved or which bear the composition as a coating on the side away from the light source must be transparent to radiation of wavelengths $W_1$ and $W_2$.

The novel light-sensitive compositions herein described are useful in a variety of applications. Among these are:

(1) Printing applications.—Very soft paper, as for example, tissue paper can be easily imaged when it has been treated with the subject photosensitive composition, by projecting an image onto the treated surface using light of wavelength $W_1$. The imaged paper can then be easily deactivated by light of wavelength $W_2$.

(2) Pattern lay-out for metal working.—The photosensitive composition may be applied to a metal surface when suitably formulated as a paint or a lacquer. The metal surface may then be marked by irradiation with light of one wavelength through a suitable template and the image so produced may be made permanent by irradiation with light of a second wavelength. The image may correspond to holes which are to be drilled or other operations of metal working and manufacture. This technique is particularly valuable when the metal to be marked has an irregular shape.

(3) Blue prints.—When applied to paper, the light compositions of this invention form images in diazo printout equipment, where they can be made to give readily a variety of shades. The image is then deactivated by irradiation with light of a second wavelength. For many of the formulations, this deactivation may be effected by common room light during ordinary usage. In this case, no separate deactivation step is required.

(4) Microfilm.—The compositions of this invention may be formulated into films which can be irradiated and deactivated without being heated or treated with messy chemicals. Because of the excellent resolution, large reductions in size can be made. These microimages provide a convenient and space-saving way of storing vital records.

Representative examples illustrating the present invention follow:

General procedure for evaluation of deactivators.—A stock solution is prepared by dissolving 0.10 g. (0.0002 mole) of tris(4-diethylamino-o-tolyl)methane, 0.066 g. (0.0001 mole) of 2,2'-bis(o-chlorophenyl)-4,4',5,5'-tetraphenylbiimidazole, and 0.076 g. (0.0004 mole) of p-toluenesulfonic acid monohydrate in 50 ml. of a solution consisting of 8% by volume of polyethylene glycol having an average molecular weight of 600 ("Carbowax" 600 supplied by Union Carbide Corp.) in a mixture of 1:1 by volume of toluene and ethanol. In 2 ml. of this solution is dissolved 1 to 5 mg. of the candidate deactivator. Filter paper is impregnated with this solution and allowed to air-dry. One half of the treated paper is covered with a "Lucite" acrylic filter (Filter A) which transmits light only with wavelengths longer than 3450 A. The other half of the treated paper is covered with a Corning 7-54 filter (Filter B, supplied by Corning Glass Co.) which transmits light having a wavelength between 2500 A. and 3900 A. The paper is irradiated through the filters with two flashes from a low pressure xenon flash tube having an input of 200 watt-seconds and a light output of 5000 candle power seconds distributed between the wavelengths of 3400 A. and 6500 A. (supplied by Hico Corp., Watertown, Mass., under the name of Hico-Lite Electronic Flash, Model K). The position of the filters is then reversed and the irradiation repeated. If, as a result of this mode of irradiation, both halves of the treated paper have the same depth of color no deactivation has occurred. If the two sections of the paper are of different color intensities, deactivation has taken place. In the portion of the paper of lower color intensity the filtered light first to reach the paper caused deactivation and the light passed through the second filter caused color formation. Various representative oxidant components of the redox couple that have been used and the results obtained with them are listed in Table 1.

TABLE 1.—FUNCTION OF LIGHT IMPINGED UPON PHOTOSENSITIVE COMPOSITION COMPRISING VARIOUS OXIDANT COMPONENTS OF REDOX COUPLE

| Ex. No. | Oxidant Component | Function of Filtered Light, using— | |
|---|---|---|---|
| | | Filter A | Filter B |
| 1 | Anthrone | Color formation | Deactivation. |
| 2 | 9-(2,4-dichlorophenyl)acridine | Deactivation | Color formation. |
| 3 | 6-acetyl-1H-benzonaphthene-1,3 (2H)-dione. | do | Do. |
| 4 | 3-methylisoquinoline | Color formation | Deactivation. |
| 5 | 1,10-phenanthroline | do | Do. |
| 6 | Phenazine | Deactivation | Color formation. |
| 7 | 1,4-dibenzylphenazine | do | Do. |
| 8 | 1,4-dimethylphenazine | do | Do. |
| 9 | 2-amino-3H-phenoxazin-3-one | do | Do. |
| 10 | 1,6-pyrenequinone | do | Do. |
| 11 | Quinoline | Color formation | Deactivation. |

Representative photo-oxidants.—Various photo-oxidants are made $2\times10^{-5}$ molar in 1:1 by volume of toluene-ethanol containing 10% by volume of "Carbowax" 600 brand of polyethylene glycol having an average molecular weight of 600. The solution is also $2\times10^{-5}$ molar in tris(4-diethylamino-o-tolyl)methane, $10^{-5}$ molar in 1,6-pyrenequinone, and $4\times10^{-5}$ molar in p-toluenesulfonic acid monohydrate. The separate solutions are taken up on filter paper and the paper is air dried and irradiated beneath the filters as described above. In each case the light passing through Filter B initiates color formation while the light passing through Filter A deactivates at photosensitive composition. These results are shown by the lower intensity of the color developed on the paper in that area first irradiated by the light passing through Filter A. The photo-oxidants used in the different compositions are listed in Table 2.

TABLE 2

| Photo-oxidant: | Ex. No. |
|---|---|
| 1-diacetylaminobenzotriazole | 12 |
| 2-diacetylaminobenzotriazole | 13 |
| 1,1'-bibenzotriazole | 14 |
| 1,2'-bibenzotriazole | 15 |
| Carbon tetrabromide | 16 |
| 2,6-dimethyl - 4 - (1,1,3,3-tetrafluoro-1,3-dichloroisopropylidene)-2,5-cyclohexadien-1-one | 17 |
| Tetraacetylhydrazine | 18 |
| Tetraphenylhydrazine | 19 |
| N,N,O-triacetylhydroxylamine | 20 |
| 1-diacetylamino-4-chloropyrazole | 21 |
| 1-diacetylamino-3,5-diphenyl-1H-1,2,4-triazole | 22 |

Representative color-generators.—Various color-generators in an amount of 100 mg. are added to 50 ml. portions of a solution of 1:1 by volume of toluene-ethanol containing 8% by volume of "Carbowax" 600 brand of polyethylene glycol having a molecular weight of 600. Each portion of the solution also contains 35 mg. of 1,6-pyrenequinone, 66 mg. of 2,2'-bis(o-chlorophenyl)-4,4',5,5'-tetraphenylbiimidazole, and 20 mg. of p-toluenesulfonic acid monohydrate. Filter paper is impregnated with each solution, air dried and the treated paper is irradiated as described in the general procedure for evaluating deactivators. Irradiation through the Filter B produces color of a shade depending upon the structure of the color-generator. A subsequent exposure to light transmitted by Filter A deactivates the composition so it is no longer photosensitive. The color-generators used in the different compositions together with the colors they produce are listed in Table 3.

TABLE 3

| Ex. No. | Color-Generator | Color Produced |
|---|---|---|
| 23 | Bis(4-diethylamino-o-tolyl)(p-benzylthiophenyl)methane. | Gray. |
| 24 | Bis(4-diethylamino-o-tolyl)(3,4-methylenedioxyphenyl)methane. | Green-gray. |
| 25 | 1,4-bis[bis(p-dimethylaminophenyl)methyl]-benzene. | Green-blue. |
| 26 | Tris(p-dimethylaminophenyl)methane | Violet. |
| 27 | α,β-Dicyano-4-dimethylaminohydrocinnamamide. | Red-violet. |
| 28 | α,β-Dicyano-4-dimethylamino-hydrocinnamic acid, methyl ester. | Scarlet. |
| 29 | 10-benzoyl-3,7-bis(dimethylamino)-phenothiazine. | Green-blue. |

EXAMPLE 30

Photosensitive paper coating

A coating composition is prepared with the following ingredients:

| | | |
|---|---|---|
| Bis(4 - diethylamino - o - tolyl)(4-isopropyl-thio-m-tolyl)methane | mg | 100 |
| Bis(4-diethylamino-o-tolyl)phenylmethane | mg | 30 |
| 2,2' - bis(o-chlorophenyl) - 4,4'-5,5' - tetraphenylbiimidazole | mg | 330 |
| 1,6-pyrenequinone | mg | 23.2 |
| Polyethylene glycol (mol. wt. about 550, "Carbowax" 550) | g | 5 |
| p-Toluenesulfonic acid monohydrate | mg | 76 |
| Colloidal silica (10–20 mμ) | g | 2.5 |
| Cellulose acetate | g | 5.0 |
| Acetone | g | 42.5 |

The composition is spread on bond paper with a doctor blade set at a height of 7 mils and allowed to dry in air in the dark for 30 minutes. The coated paper is then irradiated by the pattern formed by light from a mercury arc lamp filtered through Filter B and passed through a stencil. The image thus produced in the coating is rendered permanent by exposing the entire surface to light from a 500-watt incandescent filament projection lamp.

EXAMPLE 31

Photosensitive paint

A paint is prepared by mixing the following ingredients:

| | | |
|---|---|---|
| Tris(4-diethylamino-o-tolyl)methane | mg | 100 |
| 2,2'-bis(o-chlorophenyl)-4,4',5,5'-tetraphenylbiimidazole | mg | 66 |
| 1,6-pyrenequinone | mg | 35 |
| Polyethylene glycol (mol. wt. 600, "Carbowax" 600) | g | 0.5 |
| p-Toluenesulfonic acid monohydrate | mg | 76 |
| Titanium dioxide pigment | mg | 250 |
| Nylon resin | g | 3 |
| Methanol | g | 14 |
| Trichloroethylene | g | 6 |

Portions of the above composition are brushed on aluminum, steel, and glass and allowed to dry. The coated materials are irradiated through a stencil with ultraviolet light from a General Electric UH–3 360-watt medium pressure mercury lamp. The resultant image is made permanent by irradiation with light from a 500-watt incandescent projection lamp. The coating resists abrasion under normal handling but is readily removed after softening with methanol. Thinner compositions are applied by spraying and found to be similarly photosensitive and capable of deactivation with visible light.

EXAMPLE 32

Clear photosensitive film

A solution is prepared with the following ingredients:

| | | |
|---|---|---|
| Bis(4-diethylamino - o - tolyl) (p-benzylthiophenyl)-methane | mg | 114 |
| 2,2'-bis(c-chlorophenyl) - 4,4',5,5'-tetraphenylbiimidazole | mg | 132 |
| Phenazine | mg | 36 |
| Polyethylene glycol (mol. wt. 600, "Carbowax" 600) | mg | 117 |
| p-Toluenesulfonic acid monohydrate | mg | 72 |
| Cellulose acetate butyrate | g | 3.6 |
| Acetone | g | 15 |

The resultant solution is cast into a clear film and is coated on paper. Both the film and coated paper are irradiated through a stencil first through each of Filters A and B as described above and then through the filters in interchanged positions. The light used was that from three flashes of a low pressure xenon flash tube described at the beginning of the examples. The portion of the film and the portion of the coated paper first irradiated with light passed through Filter B bear a positive image while the areas first irradiated with light passed through Filter A show a negative image. Further irradiation does not produce more color in either type of image.

EXAMPLE 33

Photographic film

A solution is made to comprise:

| | | |
|---|---|---|
| Tris(4-diethylamino-o-tolyl)methane | mg | 150 |
| 2,2' - bis(o - chlorophenyl) - 4,4',5,5' - tetraphenylbiimidazole | mg | 70 |
| 1,6-pyrenequinone | mg | 40 |
| Polyethylene glycol (mol. wt. 600, "Carbowax" 600) | mg | 300 |
| p-Toluenesulfonic acid monohydrate | mg | 150 |
| Polyacrylonitrile | g | 4.2 |
| N,N-dimethylformamide | g | 37 |

Films from the solution are cast on glass sheets and dried in a dark room under a heat lamp. The clear yellow films are trimmed to fit into a 35 mm. camera. Exposure to an outdoor scene for 20 minutes at an "*f*" stop of 2.8 produces no visible change in the film. The film is, however, deactivated in the areas of high light intensity, and a positive picture is developed by irradiating the film through Filter B with the light from five flashes of the xenon flash tube described earlier.

In a similar manner, a picture is taken of a printed page. A four minute exposure while the printed page is being illuminated by a sun lamp produces a latent image which is developed by exposure to the light from the xenon flash tube passed through Filter B. A direct positive reproduction of the printed page is obtained. The printed material is easily read with suitable magnification. The resolution is excellent.

EXAMPLE 34

Photographic printing

The following solution is prepared:

| | |
|---|---|
| Tris(4-diethylamino-o-tolyl)methane ---------mg-- | 100 |
| 2,2'-bis(o-chlorophenyl)-4,4',5,5'-tetraphenyl-biimidazole ---------mg-- | 66 |
| 1,6-pyrenequinone ---------mg-- | 35 |
| Polyethylene glycol (mol. wt. 600, "Carbowax" 600) ---------g-- | 4 |
| p-Toluenesulfonic acid monohydrate ---------mg-- | 76 |
| Cellulose acetate ---------mg-- | 500 |
| Acetone ---------ml-- | 36 |

Filter paper is impregnated with the solution and air-dried. The image of a line drawing on a 35 mm. photographic slide is projected onto the treated paper for two minutes at a distance of three feet by means of a projector fitted with a 300 watt lamp. The latent image is developed by the light from one flash of the xenon flash tube (already described) filtered through Filter B. A positive reproduction of the photographic slide is obtained.

The following solutions are prepared:

| | |
|---|---|
| Tris(4-diethylamino-o-tolyl)methane ---------mg-- | 100 |
| 2,2'-bis(o-chlorophenyl)-4,4',5,5'-tetraphenylbiimidazole ---------mg-- | 66 |

Variable oxidant component of redox couple.

| | |
|---|---|
| Polyethylene glycol (mol. wt. 600) ---------g-- | 10 |
| p-Toluenesulfonic acid monohydrate ---------mg-- | 76 |
| Ethanol ---------ml-- | 45 |
| Toluene ---------ml-- | 45 |

Filter paper is impregnated with each of the solutions containing a different oxidant component of the redox couple and air-dried. Then the paper is irradiated for varying intervals with light from a 275-watt sun lamp passed through a Corning O-51 filter which transmits light of wavelengths above 3900 A. The papers are then irradiated with light from the xenon flash tube passed through Filter B referred to above. The purpose of this procedure is to determine the time required under these irradiation conditions to attain complete deactivation. Complete deactivation is indicated by the absence of color formation upon the second irradiation. The different oxidant components measured for their deactivating effect and the times needed to attain complete deactivation with them are shown in Table 4.

TABLE 4

| Ex. No. | Oxidant Component | Amount Present in Mg. | Time for Complete Deactivation, in Seconds |
|---|---|---|---|
| 35 | 1,6-pyrenequinone | 35 | 25 |
| 36 | 10-phenylimino-9-anthrone | 43 | 180 |
| 37 | {1,6-pyrenedione<br>10-phenylimino-9-anthrone | 17<br>21 | } 17 |

EXAMPLE 38

A solution is prepared using:

| | |
|---|---|
| Tris(4-diethylamino-o-tolyl)methane trihydrochloride ---------mg-- | 71 |
| 2,2'-bis(o-chlorophenyl)-4,4',5,5'-tetraphenyl-biimidazole ---------mg-- | 84 |
| 9,10-phenanthrenequinone ---------mg-- | 12 |
| Polyethylene glycol (average molecular wt. 600, "Carbowax" 600) ---------mg-- | 720 |
| Ethanol ---------g-- | 6.95 |

Filter paper is dipped into this solution and air dried at room temperature. The paper is colored by non-filtered irradiation from a medium pressure mercury lamp and is deactivated by a 500-watt photoflood (tungsten filament) lamp.

A solution is prepared with:

| | |
|---|---|
| Tris(4-diethylamino-o-tolyl)methane trihydrochloride ---------mg-- | 10 |
| 2,2'-bis(o-chlorophenyl)-4,4',5,5'-tetraphenylbiimidazole ---------mg-- | 10 |
| 1,6-pyrenequinone ---------mg-- | 10 |
| Ethanol ---------ml-- | 10 |
| Reductant component ---------ml-- | 20 |

Filter paper is immersed in the solution and allowed to become nearly dry. The paper is irradiated by the general procedure described above using Filter B for coloration and a variable number of flashes through Filter A to attain deactivation. The results that are obtained with several different reductant components are shown in Table 5.

TABLE 5.—EVALUATION OF REDUCTANT COMPONENT OF REDOX COUPLE

| Ex. | Reductant Component | Number of Flashes Required for Deactivation |
|---|---|---|
| 39 | p-Cymene | 1 |
| 40 | Polytetramethylene ethyl glycol of M.W. 1,000 | 1 |
| 41 | 1,3-cyclohexylene diacetate | 2 |
| 42 | 1,4-dihydronaphthalene | 1 |
| 43 | Benzaldehyde | 2 |
| 44 | Terephthalaldehyde cyclic bis (ethyleneacetal) | 2 |

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A photosensitive composition which is activated toward color generation by radiation of a given wavelength $W_1$ but is permanently deactivated toward color generation by a second but different wavelength $W_2$, said composition comprising (a) an essentially colorless oxidizable nitrogen-containing organic color-generator, which when contained in said photosensitive composition, is stable to oxidation by atmospheric oxygen under normal room and storage conditions but which is capable of oxidation to an intensely colored species, (b) a photo-oxidant which, when mixed with said oxidizable color-generator and irradiated with radiation of wavelength of about 2000 A. to about 4200 A. will, without further activation, oxidize said color-generator to said intensely colored species, and as an essential part of the composition, (c) a redox couple which consists of (1) a reductant component which is capable of undergoing a photo-initiated redox reaction with the oxidant component and (2) said oxidant component, which when activated by the radiation of wavelength $W_2$, undergoes with the reductant component a photo-initiated redox reaction, said photoinitiated redox reaction between the different components of the couple forming a reducing agent which is a stronger reducing agent for said photooxidant (b) when irradiated with radiation of wavelength $W_1$ than is said color generator (a), and prevents photo-oxidative color-formation by radiation of wavelength $W_1$, said oxidant component being further characterized in that it undergoes little, if any, photo-oxidative reaction with said color generator regardless of whether the impinging radiation is of wavelength $W_1$ or wavelength $W_2$, and said redox couple not being a reducing agent for said photo-oxidant (b) when irradiated with radiation of wavelength $W_1$.

2. A light-sensitive material comprising a supporting base carrying a light-sensitive composition as defined in claim 1.

3. A light-sensitive material comprising a plastic film containing a light-sensitive composition as defined in claim 1.

4. Paper treated with a light-sensitive composition as defined in claim 1.

5. A photosensitive composition according to claim 1 wherein said (a) is an aminotriarylmethane containing at least two p-dialkylamino-substituted phenyl groups having, ortho to the methane carbon atom, a substituent selected from the group consisting of alkyl, alkoxy and halogen, said (b) being a 2,2′-(o-substituted phenyl)-4,4′-5,5′-tetraphenyl biimidazole, the oxidant component of said (c) being a quinone and the reductant component of said (c) being a polyether.

6. The composition of claim 1 wherein
component (a) is selected from the class consisting of (1) a leuco dye having one to two removable hydrogens, the removal of which forms a differently colored compound; (2) an N-acyl derivative of a leuco dye defined in (a)(1) above; (3) a triarylmethane wherein the single remaining methane bond is substituted with benzylthio, 2-phenylhydrazino, alkoxycarbonyl or disulfide; (4) an organic amine; (5) a 2-benzothiazolinone hydrazone or N-acyl derivative thereof, oxidizable to a diazonium compound, in combination with a coupling component; and (6) an N,N-dialkylphenylenediamine in combination with a coupling component;
wherein component (b) is selected from the class consisting of (1) a hexaarylbiimidazole, (2) a tetraarylhydrazine, (3) a diacylaminobenzotriazole, (4) a benzothiazole disulfide, (5) a triacylhydroxylamine, (6) a diacylaminotriazole, (7) an alkylidene-2,5-cyclohexadiene-1-one, (8) polymethacrylaldehyde, (9) a diacylaminopyrazole, (10) a bibenzotriazole and (11) a halogen compound having a bond dissociation energy to produce a first free radical of not less than about 40 kilogram calories per mole, and (12) tetraacylhydrazine;
wherein the oxidant component (2) of redox couple (c) is selected from the class consisting of (1) a quinone, (2) a ketone, (3) a phenazine, (4) an acridine, (5) a phenoxazinone, (6) a quinoline, (7) a phenanthroline, (8) an isoquinoline, (9) an anil and (10) a polyvalent metal compound; and
wherein the reductant component (1) of redox couple (c) is selected from the class consisting of (1) ethers, (2) esters, (3) alcohols, (4) allylic compounds, (5) benzylic compounds, (6) acetals, (7) aldehydes, (8) amides, (9) triphenyl tin hydride, (10) dioctylphosphite, (11) triphenyl silane and (12) phenols.

7. The composition of claim 6 wherein
component (a) is selected from the class consisting of (1) an aminotriarylmethane, (2) an aminoxanthene, (3) an aminothioxanthene, (4) an amino-9,10-dihydroacridine, (5) an aminophenoxazine, (6) an aminophenothiazine, (7) an aminodihydrophenazine, (8) an aminodiphenylmethane, (9) an aminohydrocinnamic acid, (10) a leucoindigoid dye, (11) a 1,4-diamino-2,3-dihydroanthraquinone, (12) an acylated dihydrophenazine, (13) an acylated phenothiazine, (14) an acylated phenoxazine, (15) tris-(p-dimethylaminophenyl)benzylthiomethane, (16) 1-tris(p - diethylaminophenyl)methyl - 2-phenylhydrazine, (17) tris(4-diethylamino-o-tolyl)ethoxycarbonylmethane, (18) bis(4-dipropylamino-o-tolyl)(o-fluorophenyl)butoxycarbonylmethane, (19) bis[tris(4 - diethylamino - o - tolyl)methyl]disulfide, (20) 4,4′-ethylenedianiline, (21) diphenylamine, (22) N,N-dimethylaniline, (23) 4,4′-methylenedianiline, (24) triphenylamine, and (25) N-vinylcarbazole.

8. The composition of claim 7 wherein component (b) is selected from the class consisting of
2,2′ - bis(p-methoxyphenyl)-4,4′,5,5′-tetraphenylbiimidazole,
2,2′-bis(p-cyanophenyl)-4,4′,5,5′-tetrakis(p-methoxyphenyl)-biimidazole,
2,2′-bis(m-nitrophenyl)-4,4′,5,5′-tetrakis(2,4-dimethoxyphenyl)biimidazole,
2,2′-bis(3,4,5-trimethylphenyl)-4,4′,5,5′-tetrakis-(p-methylthiophenyl)biimidazole,
2,2′-bis(o-methoxyphenyl)-4,4′,5,5′-tetraphenylbiimidazole,
2,2′-bis(2,4-dichlorophenyl)-4,4′,5,5′-tetrakis(p-methoxyphenyl)biimidazole,
2,2′-bis(o-bromophenyl)-4,4′,5,5′-tetraphenylbiimidazole,
2,2′-bis(2,4-dimethoxyphenyl)-4,4′,5,5′-tetraphenylbiimidazole,
2,2′-bis(o-chlorophenyl)-4,4′,5,5′-tetraphenylbiimidazole,
tetraphenylhydrazine,
tetra-p-tolylhydrazine,
tetrakis(p-methoxyphenyl)hydrazine,
tetraacetylhydrazine,
tetraformylhydrazine,
tetrabenzoylhydrazine,
1-diacetylaminobenzotriazole,
1-dibenzoylamino-5-chlorobenzotriazole,
bis(2-benzothiazolyl)disulfide,
bis(6-methoxy-2-benzothiazolyl)disulfide,
N,N,O-triacetylhydroxylamine,
N,N,O-tripropionylhydroxylamine,
N,N,O-tribenzoylhydroxylamine,
N,N,O-tri-p-chlorobenzoylhydroxyamine,
1-diacetylamino-3,5-diphenyl-1H-1,2,4-triazole,
1-dipropionylamino-3,5-diphenyl-1H-1,2,4-triazole,
1-dibenzoylamino-4,5-diphenyl-1H-1,2,3-triazole,
2,6-dimethyl-4-(1,1,3,3-tetrafluoro-1,3-dichloroisopropylidene)-2,5-cyclohexadien-1-one,
polymethacrylaldehyde,
1-diacetylaminopyrazole,
1-dipropionylamino-4-chloropyrazole,
1,2′-bibenzotriazole,
5,5′-dichloro-1,1′-bibenzotriazole,
5,5′-dimethyl-1,1′-bibenzotriazole,
carbon tetraiodide,
iodoform,
carbon tetrabromide,
1,2,3,4-tetrabromobutane,
hexachloroethane, and
1,2,3-tetrachlorobenzene.

9. The composition of claim 8 wherein the oxidant component (2) of redox couple (c) is selected from the class consisting of
1,2-naphthoquinone,
2,5-diethoxy-p-benzoquinone,
3-acetylphenanthrenequinone,
1,6-pyrenequinone,
1,8-pyrenequinone, 4-nitro-9,10-phenanthrenequinone,
2-methylanthraquinone,
1H-benzonaphthen-1-one,
6-acetyl-1H-benzonaphthene-1,3(2H)-dione,
anthrone,
6-benzoyl-8-chloro-1H-benzonaphthene-1,3(2H)-dione,
phenazine,
1,4-dimethylphenazine,
2,3-dimethoxyphenazine,
1,4-dibenzylphenazine,
9-phenylacridine,
9-(2,4-dichlorophenyl)acridine,
2-methyl-9-phenylacridine,
2-ethoxy-9-phenylacridine,
2-amino-3H-phenoxazin-3-one,
2-amino-7-methyl-3H-phenoxazin-3-one,
2-amino-7-phenyl-3H-phenoxazin-3-one,
2-dimethylamino-3H-phenoxazin-3-one,
quinoline,
4-benzylquinoline,
4-methylquinoline,
8-phenylquinoline,
1,10-phenanthroline,
3,4-dimethyl-1,10-phenanthroline,
3,4,8-trimethyl-1,10-phenanthroline,
3,4,7,8-tetramethyl-1,10-phenanthroline,
isoquinoline,
3-ethylisoquinoline,
3-methylisoquinoline,
6-methylisoquinoline,
10-phenylimino-9-anthrone,
10-p-tolylimino-9-anthrone,
ferric chloride,
ferric acetate, and
ferric ammonium citrate.

10. The composition of claim 9 wherein the reductant component (1) of redox couple (c) is selected from the class consisting of diethyl ether,
dioxane,
polyethylene glycol of M.W. 600,
polypropylene glycol of M.W. 1000,
polytetramethyleneether glycol of M.W. 1000,
methoxyethyl terephthalate,
cyclohexyl adipate,
1,3-cyclohexylene diacetate,
isobutanol,
isooctanol,
cyclohexanol,
1,2,3,4-tetrahydro-1,4-naphthalenediol,
furfuryl alcohol,
diethanolamine,
triethanolamine,
1,4-dihydronaphthalene,
cumene,
p-cymene,
tetralin,
benzaldehyde dioctylacetal,
terephthalaldehyde cyclic bis(ethyleneacetal),
terephthalaldehyde bis(dioctylacetal),
benzaldehyde,
m-chlorobenzaldehyde;
terephthalaldehyde,
adipamide,
N,N-diethylformamide,
2-imidazolidinone,
2-oxohexamethylenimine,
succinamide,
triphenyl tin hydride,
dioctylphosphite,
triphenylsilane, and
2,6-di-t-butyl-p-cresol.

11. The composition of claim 6 wherein component (a) is an aminotriarylmethane containing at least two p-dialkylamino-substituted phenyl groups having, ortho to the methane carbon atom, a substituent selected from the group consisting of alkyl, alkoxy and halogen.

12. The composition of claim 11 wherein component (b) is a 2,2′,4,4′,5,5′-hexaphenylbiimidazole having in the 2- and 2′-phenyl rings an ortho substituent that is selected from chlorine, bromine, fluorine, $C_1$–$C_6$ alkoxy, or $C_1$–$C_6$ alkyl.

13. The composition of claim 12 wherein the oxidant component (2) of redox couple (c) is selected from the class consisting of 1,2-naphthoquinone,
2,5-diethoxy-p-benzoquinone,
3-acetylphenanthrenequinone,
1,6-pyrenequinone,
1,8-pyrenequinone,
4-nitro-9,10-phenanthrenequinone, and
2-methylanthraquinone.

14. The composition of claim 13 wherein the reductant component (1) of redox couple (c) is selected from the class consisting of diethyl ether,
dioxane,
polyethylene glycol of M.W. 600,
polypropylene glycol of M.W. 1000, and
polytetramethylene ether glycol of M.W. 1000.

15. The composition of claim 6 wherein the oxidant component (2) of redox couple (c) is selected from the class consisting of 1,2-napthoquinone,
2,5-diethoxy-p-benzoquinone,
3-acetylphenanthrenequinone,
1,6-pyrenequinone,
1,8-pyrenequinone,
4-nitro-9,10-phenanthrenequinone,
2-methylanthraquinone,
1H-benzonaphthen-1-one,
6-acetyl-1H-benzonaphthene-1,3(2H)-dione,
anthrone,
6-benzoyl-8-chloro-1H-benzonaphthene-1,3(2H)-dione,
phenazine,
1,4-dimethylphenazine,
2,3-dimethoxyphenazine,
1,4-dibenzylphenazine,
9-phenylacridine,
9-(2,4-dichlorophenyl)-acridine,
2-methyl-9-phenylacridine,
2-ethoxy-9-phenylacridine,
2-amino-3H-phenoxazin-3-one,
2-amino-7-methyl-3H-phenoxazin-3-one,
2-amino-7-phenyl-3H-phenoxazin-3-one,
2-dimethylamino-3H-phenoxazin-3-one,
quinoline,
4-benzylquinoline,
4-methylquinoline,
8-phenylquinoline,
1,10-phenanthroline,
3,4-dimethyl-1,10-phenanthroline,
3,4,8-trimethyl-1,10-phenanthroline,
isoquinoline,
3-ethylisoquinoline,
3-methylisoquinoline,
6-methylisoquinoline,
10-phenylimino-9-anthrone,
10-p-tolylimino-9-anthrone,
ferric chloride,
ferric acetate, and
ferric ammonium citrate;

and wherein the reductant component (1) of redox couple (c) is selected from the class consisting of diethyl ether,
dioxane,
polyethylene glycol of M.W. 600,
polypropylene glycol of M.W. 1000,
polytetramethylene ether glycol of M.W. 1000,
methoxyethyl terephthalate, cyclohexyl adipate,
1,3-cyclohexylene diacetate,
isobutanol,
isooctanol,
cyclohexanol,
1,2,3,4-tetrahydro-1,4-naphthalenediol,
furfuryl alcohol,
diethanolamine,
triethanolamine,
1,4-dihydronaphthalene,
cumene,
p-cymene,
tetralin,
benzaldehyde dioctylacetal,
terephthalaldehyde cyclic bis(ethyleneacetal),
terephthalaldehyde bis(dioctylacetal),
benzaldehyde,
m-chlorobenzaldehyde,
terephthalaldehyde,
adipamide,
N,N-diethylformamide,
2-imidazolidinone,
2-oxohexamethylenimine,
succinamide,
triphenyl tin hydride,
dioctylphosphite,
triphenylsilane, and 2,6-di-t-butyl-p-cresol.

16. The composition of claim 6 wherein the oxidant component (2) of redox couple (c) is selected from the class consisting of 1,2-naphthoquinone,
2,5-diethoxy-p-benzoquinone,
3-acetylphenanthrenequinone,
1,6-pyrenequinone, 1,8-pyrenequinone,
4-nitro-9,10-phenanthrenequinone, and
2-methylanthraquinone;

and wherein the reductant component (1) of redox couple (c) is selected from the class consisting of diethyl ether,
dioxane,
polyethylene glycol of M.W. 600,
polypropylene glycol of M.W. 1000, and
polytetramethylene ether glycol of M.W. 1000.

17. The process of producing an image having a light-stable background by irradiating, in a step-wise manner, a composition as defined in claim 1, said irradiation being effected, in any order with light of two different wavelengths, one being between 2000 A. and 4200 A. and the other being between 2000 A. and 5500 A., the first of said wavelengths of light to be applied being in a graphic pattern.

References Cited

UNITED STATES PATENTS

| | | | |
|---|---|---|---|
| 2,927,025 | 3/1960 | Ryskiewicz | 96—90 |
| 3,042,515 | 7/1962 | Wainer | 96—90 |
| 3,079,258 | 2/1963 | Agruss | 96—90 |
| 3,082,086 | 3/1963 | Sprague | 96—90 |
| 3,146,348 | 8/1964 | Workman | 96—49 |
| 3,129,101 | 4/1964 | Workman | 96—49 |

FOREIGN PATENTS

| | | |
|---|---|---|
| 917,919 | 2/1963 | Great Britain. |

NORMAN G. TORCHIN, *Primary Examiner.*

C. E. DAVIS, *Assistant Examiner.*